United States Patent [19]
Denny et al.

[11] Patent Number: 5,544,325
[45] Date of Patent: Aug. 6, 1996

[54] SYSTEM AND METHOD FOR GENERATING MESSAGES FOR USE IN TRANSACTION NETWORKS

[75] Inventors: George S. Denny; Robert S. Lai, both of San Jose; Sherry H. Li, Morgan Hill; Joseph F. Murphy; Hoang M. Nguyen, both of San Jose; Mark N. Ziebarth, Morgan Hill, all of Calif.

[73] Assignee: International Business Machines Corporation, Armonk, N.Y.

[21] Appl. No.: 215,348

[22] Filed: Mar. 21, 1994

[51] Int. Cl.⁶ .......................... H04L 29/08; H04L 12/00; G06F 13/42
[52] U.S. Cl. .................. 395/200.17; 395/200.1; 395/876; 364/284.1
[58] Field of Search ................ 395/200, 200.12, 395/200.15, 200.17, 876, 200.1, 200.13; 370/94.1, 60.1; 364/284.1

[56] References Cited

U.S. PATENT DOCUMENTS

| | | | |
|---|---|---|---|
| 4,714,992 | 12/1987 | Gladney et al. | 364/200 |
| 4,714,996 | 12/1987 | Gladney et al. | 364/300 |
| 4,819,159 | 4/1989 | Shipley et al. | 364/200 |
| 4,823,304 | 4/1989 | Frantz et al. | 364/900 |
| 4,887,075 | 12/1989 | Hirasawa | 395/200 |
| 4,949,373 | 8/1990 | Baker, Jr. et al. | 379/96 |
| 5,027,316 | 6/1991 | Frantz et al. | 364/900 |
| 5,051,892 | 9/1991 | Ferree et al. | 364/200 |
| 5,201,044 | 4/1993 | Frey, Jr. et al. | 395/575 |
| 5,212,724 | 5/1993 | Nazarenko et al. | 379/58 |
| 5,247,672 | 9/1993 | Mohan | 395/650 |
| 5,249,300 | 9/1993 | Bachman et al. | 395/800 |
| 5,280,612 | 1/1994 | Lorie et al. | 395/600 |
| 5,333,266 | 7/1994 | Boaz et al. | 395/200 |
| 5,367,643 | 11/1994 | Chang et al. | 395/200 |
| 5,426,427 | 6/1995 | Chinnock et al. | 395/200.15 |
| 5,432,926 | 7/1995 | Citron et al. | 395/200.12 |
| 5,475,817 | 12/1995 | Waldo et al. | 395/200.12 |

OTHER PUBLICATIONS

Callaghan, P. J. and Tomita, E. A., "Remote Servers for LANRES using 6.2", *IBM Technical Disclosure Bulletin*, No. 4A, Sep. 1992, pp. 345–349.

Menditto, L. F., Skogman, J. and Sunday, G., "Single System Image and Load Balancing for Network Access to a Loosely Coupled Complex", *IBM Technical Disclosure Bulletin*, No. 9, Feb. 1992, pp. 464–467.

Beer, R., Chamberlain, D. J., Sears, J. F., Shah, V. V. and Wallis, C. N., "High Speed Serial Interface Protocol", *IBM Technical Disclosure Bulletin*, No. 7A, Dec. 1991, pp. 355–365.

Lee, Y. H., Yu, P. S. and Iyer, B. R., "Early Commit Scheme for Multi-System Data Sharing Using Write Completion Log", *IBM Technical Disclosure Bulletin*, Nov. 1987, pp. 7–9.

(List continued on next page.)

*Primary Examiner*—Alyssa H. Bowler
*Assistant Examiner*—Mark H. Rinehart
*Attorney, Agent, or Firm*—Baker, Maxham, Jester & Meador

[57] ABSTRACT

A communication system includes a network of transaction management systems having the same or different operating system software versions. Each transaction management system includes an associated input device for generating a transaction request or message switch. The transaction requests and message switches generated by a particular input device can be executed by the transaction management system associated with the device, and alternatively by remote transaction management systems in the network. To provide for remote execution of transaction requests and message switches, the system includes means for generating transaction request messages and message switch messages that have prefixes which can be dynamically extended as required for use by the appropriate remote transaction management system, without requiring upgrading the software of the remote system.

23 Claims, 3 Drawing Sheets

OTHER PUBLICATIONS

Iyer, B. R., Lee, Y. H. and Yu, P. S., "Progressive Transaction Recovery Scheme for Distributed DB/DC Systems", *IBM Technical Disclosure Bulletin*, Aug. 1987, pp. 972–977.

Dias, D. M., Iyer, B. R., Robinson, J. T. and Yu, P. S., "Integrated Concurrency and Shared Buffer Coherency Control for Multi–Systems", *IBM Technical Disclosure Bulletin*, Mar. 1986, pp. 4642–4650.

Bailey, C. G. and Filip, J. A., "Multiple Destination Secondary Transactions", *IBM Technical Disclosure Bulletin*, Jun. 1984, p. 620.

Eswaran, K., Hauser, C. H. and Mehl, J. W., "Direct Commit Protocols for Distributed Transaction Processing", *IBM Technical Disclosure Bulletin*, Dec. 1981, pp. 3183–3185.

Todd, S., "Concurrency System Suitable for Distributed Databases", *IBM Technical Disclosure Bulletin*, Jun. 1978, pp. 383–386.

SYSTEM AND METHOD FOR GENERATING MESSAGES FOR USE IN TRANSACTION NETWORKS

BACKGROUND OF THE INVENTION

1. Field of the Invention

The present invention relates generally to communications networks, and more particularly to systems for generating transaction request messages and switching messages in transaction execution networks.

2. Description of the Related Art

Expanding communications capabilities has made possible the use of widely distributed networks for a large variety of applications. As but one example, networks have been provided to support communications in transaction processing systems that have users at locations remote from the transaction processing site. One transaction processing system that employs network architecture to support transaction processing is the Information Management System (IMS) available from IBM Corporation. The IMS product is a database management system (DBMS) that provides access to, and manages, a hierarchical database. In such networks, a transaction request can be entered into the system at one information management system (IMS) location, which processes the transaction and then sends the processed transaction back to the originating device or to one or more remote IMS locations for further processing.

The architecture of such networks typically provides for peer-to-peer communication, i.e., one IMS can communicate directly with another IMS for the purpose of transferring data. Under some circumstances, transaction requests and message switches can also be transmitted for remote execution of the request.

Remote processing of transaction requests is desirable. For example, remote transaction processing results in relatively greater flexibility in computational load sharing among the IMSs in the network. In other words, remote transaction processing facilitates distributing workload and distributing data storage requirements among the IMSs of the network.

Unfortunately, when a transaction request is entered from a program or device into the local IMS that is associated with that program or device, execution of the request by a remote IMS may not always be possible. This is because IMSs that are remote from the device may have input message buffer capacities which are not the same as the output buffer capacity of the local IMS. Consequently, a message having a prefix that is of the fixed specified length for processing in the local IMS will in many cases be incompatible for processing by remote IMSs. Also, when an IMS receives a message which contains fields that are not recognized by the IMS (which can happen when the message originates from an IMS having a higher software version than the receiving IMS), the receiving IMS will not retain the unrecognized fields, thereby causing corruption of the message.

Alternatively, all IMSs in the network can be retrofitted with software upgrades to have a common processing system (and, hence, to have buffers with compatible capacities). Unfortunately, retrofitting all IMS in a network is time-consuming and expensive, and typically must be repeated each time one IMS receives an improved processing program. Such repeated software upgrades would otherwise be necessary, without the present invention, to ensure compatibility, i.e., interoperability, of transaction processing for all IMSs.

As recognized by the present invention, remote transaction request and message switch processing can be established in a peer-to-peer system architecture without unduly expensive or time-consuming on-site refurbishment. Accordingly, it is an object of the present invention to provide a system and method for generating transaction request messages which can be processed in IMSs that are remote from the IMS into which the request is originally entered. Another object of the present invention is to provide a system and method for generating message switches which can be processed in IMSs that are remote from the IMS into which the message switch is originally entered. Still another object of the present invention is to provide a system and method for generating messages which is easy to use and cost-effective to manufacture. Another object of the present invention is to provide a system and method for generating messages which provides for adding new message features and modifying existing message features in networks without loss of data and without requiring changes to the software of the IMSs in the network.

SUMMARY OF THE INVENTION

A transaction processing system includes means for generating a transaction request and request receiving means for receiving the request. Also, the system includes message generation means which are responsive to the request receiving means for generating a message representative of the transaction. In accordance with the present invention, the message includes a prefix, and the prefix includes an extended segment that has at least one dynamically variable attribute, e.g., the prefix can have dynamically variable content and size. Message receiving means, which includes an input data buffer for receiving the message, establishes the capacity of the input data buffer in response to the message such that all of the message is retained in the buffer.

Preferably, the system includes a plurality of message receiving means with each message receiving means including an extended prefix handler. The message can be relayed from a relay message receiving means to a processing message receiving means for processing the transaction request. As intended by the present invention, the prefix establishes which message receiving means processes the transaction request.

In one presently preferred embodiment, the message receiving means processes the transaction request and transmits a transaction complete message to the message generation means. Additionally, the message receiving means includes means for determining the size of the prefix, and the message receiving means establishes the capacity of the input data buffer to be at least equal to the size of the prefix. As intended by the present invention, the prefix includes a first segment which is recognized by the extended prefix handler of the message receiving means and a second segment which is unrecognized by the extended prefix handler, and the message receiving means processes the first segment and retains the second segment.

In another aspect of the present invention, a method is disclosed for transmitting transaction requests between a local database management system (DBMS) and a plurality of remote DBMSs. The method of the present invention includes entering the transaction request into the local DBMS, and then determining which of the remote DBMSs is to process the transaction request. Then, a message that is representative of the transaction request is generated. The message has an extended prefix which is representative of at least one predetermined data field. Based upon the generated message, an attribute of the extended prefix is dynamically established. The message is then transmitted to the remote DBMS.

In yet another aspect of the present invention, a data transfer network includes an input device for generating a transaction request and a message generator associated with the input device for receiving the transaction request. In response to the transaction request, the message generator generates a message that has a prefix. As intended by the present invention, the message generator dynamically establishes at least one attribute of the prefix.

A first DBMS is associated with the message generator for receiving the message and transmitting the message. Also, a second DBMS is in communication with the first DBMS for receiving the message, and the second DBMS includes an input data buffer which defines a capacity. Moreover, a buffer controller is associated with the second DBMS for establishing the capacity of the data buffer in response to the message. Preferably, the second DBMS includes a transaction executor for executing the transaction request.

In still another aspect of the present invention, a method is disclosed for transmitting messages between a first database management system (DBMS) having an output data buffer and a second DBMS having an input data buffer. The method includes the steps of generating a message which has an extended prefix that is representative of at least one predetermined data field. A predetermined attribute of the extended prefix is dynamically established, and the message is transmitted from the first DBMS to the second DBMS. Next, the capacity of the input data buffer of the second DBMS is dynamically established to be at least equal to the capacity of the output data buffer of the first DBMS.

In another aspect of the present invention, a data transfer system includes a first computer which has an output data buffer and a second computer which has an input data buffer. The system further includes means which are associated with the first computer for generating a message having an extended prefix representative of at least one predetermined data field.

Additionally, the system includes means that are associated with the first computer for dynamically establishing a predetermined attribute (e.g., size and function flag) of the extended prefix. Moreover, the system includes means which are associated with the first computer for transmitting the message from the first computer to the second computer. Furthermore, means are provided for dynamically establishing the capacity of the input data buffer of the second computer to be at least equal to the capacity of the output data buffer of the first computer.

Preferably, an input device is connected to the first computer for generating a transaction request and sending the request to the message generating means. The message generating means in turn generates the message such that the message represents the transaction request.

In the presently preferred embodiment, the second computer includes a transaction executor for executing the transaction request. In accordance with the present invention, the first computer has first data processing characteristics and the second computer has second data processing characteristics which can be different from the first.

The details of the present invention, both as to its structure and operation, can best be understood with reference to the accompanying drawings, in which like reference numerals refer to like parts, and in which:

DETAILED DESCRIPTION OF THE PREFERRED EMBODIMENTS

Figure 1:
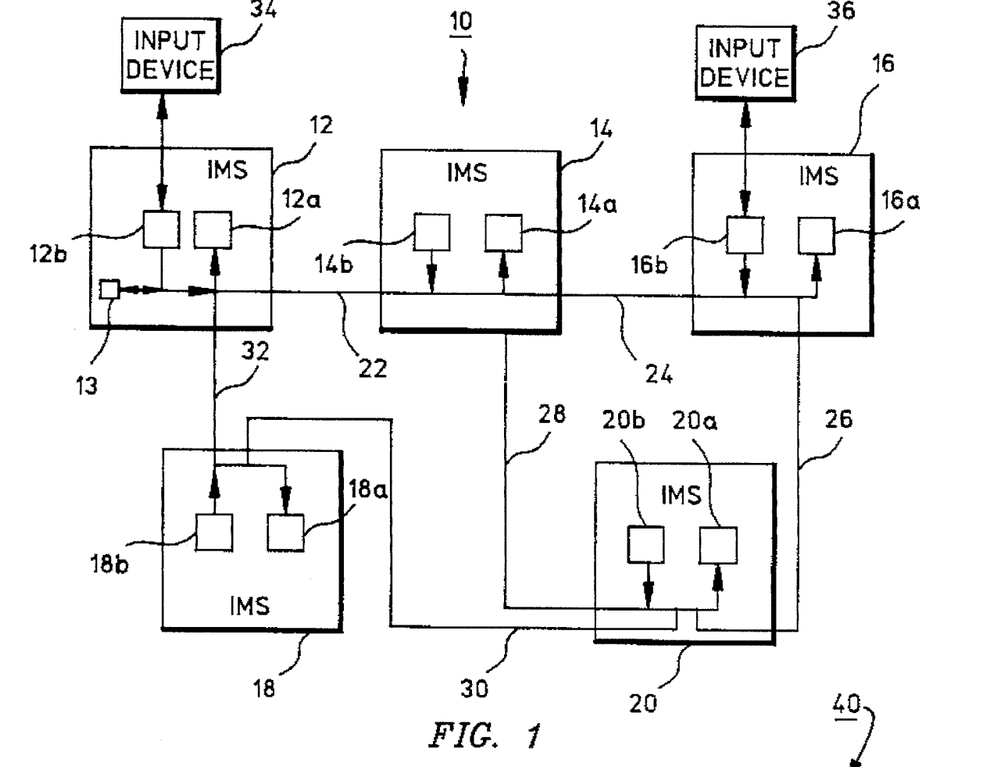
FIG. 1 a schematic diagram showing the communication network of the present invention.

Referring initially to FIG. 1, a communication network is shown, generally designated 10. As shown, the network 10 includes first, second, third, fourth, and fifth database management systems (DBMSs) 12, 14, 16, 18, 20. It is to be understood, however, that the network 10 can have greater or fewer DBMSs. It is to be further understood that the DBMSs 12–20 can be identical, or can have varying levels of software upgrades, provided that each DBMS 12–20 include the processing steps described in more detail below. Each DBMS 12–20 includes a software module for generating messages, e.g., the first DBMS 12 includes a message generator 13 for generating messages.

In the presently preferred embodiment, each DBMS 12–20 is an information management system (IMS) made by International Business Machines Corporation of Armonk, N.Y. Accordingly, each DBMS 12–20 includes a type 3090 computer with associated operating system and application software. Also, each DBMS 12–20 includes an associated input data buffer 12a–20a with extended prefix handler for receiving the prefixes and bodies of messages and an associated output data buffer 12b–20b for storing the prefixes and bodies of messages pending transmission of the messages.

As shown in FIG. 1, a plurality of communication links, represented by link lines 22, 24, 26, 28, 30, 32 interconnect the DBMSs 12–20. More particularly, the first DBMS 12 is in communication with the second DBMS 14 via a first communication link 22, and the second DBMS 14 is in communication with the third DBMS 16 via a second communication link 24. Also, the third DBMS 16 is in communication with the fifth DBMS 20 via a third communication link 26, and the second DBMS 14 is in communication with the fifth DBMS 20 via a fourth communication link 28. Furthermore, the fifth DBMS 20 is in communication with the fourth DBMS 18 via a fifth communication link 30, and the fourth DBMS 18 is in communication with the first DBMS 12 via a sixth communication link 32. It is to be understood that other communication links (not shown) can be provided in addition to or in lieu of the communication links 22–32. In the presently preferred embodiment, each communication link 22–32 is a Multiple System Coupling (MSC) link made by International Business Machines Corporation of Armonk, N.Y.

Still referring to FIG. 1, each DBMS 12–20 can be operably connected to an associated input device. For example, a first input device 34 is associated with the first DBMS 12 and a second input device 36 is associated with the third DBMS 16. As intended by the present invention, the input devices 34, 36 may be either hardware-based or software-based, and each input device 34, 36 can generate a transaction request and send the transaction request to its associated DBMS 12, 16. In the presently preferred embodiment, each input device 34, 36 is a type LU 6.2 software system made by International Business Machines Corporation of Armonk, N.Y.

As further intended by the present invention, each DBMS 12–20 performs transaction processing in response to input signals from the input devices 34, 36. Thus, for example, a transaction request can be entered from the first input device 34 into the first DBMS 12. This request can be executed in the first DBMS 12 or advantageously sent via one or more of the links 22–32 to one of the DBMSs 14–20 which is remote from the first DBMS 12 for execution by that DBMS 14–20. Then, in the case of a transaction request, the DBMS 14–20 that executed the request sends a transaction complete message back to the first DBMS 12 (and thence to the first input device 34) via one or more of the links 22–32.

Additionally, program-to-program switches and message switches can be transmitted between the DBMSs 12–20. Thus, for example, the first DBMS 12 can generate a program-to-program switch message and send the message to the second DBMS 14 via the link 22. In turn, the second DBMS 14 can process the data contained in the message as appropriate, and then send the processed data on to other DBMSs 12, 16–20 or store the data.

Figure 2:
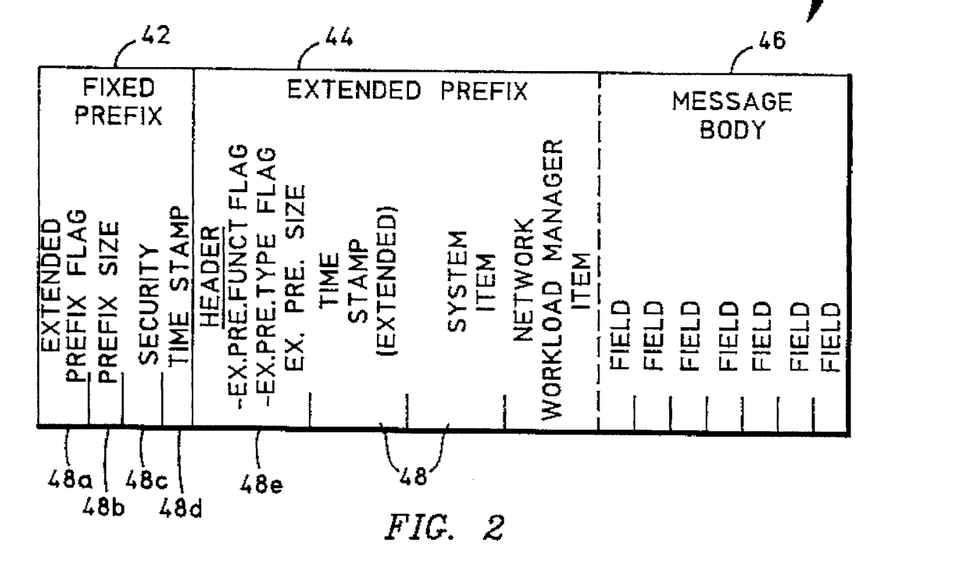
FIG. 2 is a schematic diagram showing a message with extended prefix.

FIG. 2 shows that a message 40 in accordance with the present invention includes a fixed prefix 42, an extended prefix 44, and a message body 46 that holds data fields representative of the message being transmitted. As shown in FIG. 2, the fixed prefix 42 and extended prefix 44 each include a plurality of data fields 48.

Each field 48 contains data that represents a characteristic of the message 40, e.g., a first data field 48a can function as a flag that an extended prefix is included in the message 40, a second data field 48b can contain data representing the combined size of the prefixes 42, 44, a third data field 48c can include security data, and a fourth data field 48d can include time stamp information relating to when the message 40 was generated.

Additionally, the extended prefix 44 can include other information. For example, an extended prefix header 48e preferably contains a function flag, as indicated in FIG. 2, that relates to old or new functions to be performed by DBMSs 12–20. Also, the header 48e contains an extended prefix type flag and a field representative of the size of the extended prefix 44. Further, the fields 48 of the extended prefix 44 include information which amplifies on the types of information carried in the fixed prefix 42, e.g., the extended prefix 44 can include detailed time stamp information, system item information, and network workload management information.

It is to be understood that the prefixes 42, 44 can carry additional information relating to the message 40 as is well-known in the art, and that the information discussed above is exemplary. For example, one or both of the prefixes 42, 44 can carry data representative of which DBMS 12–20 originated the message 40, and which DBMS 12–20 is to process the message 40. In any case, using a dynamically established extended prefix 44 facilitates easily adding new message information into the message 40.

Figure 3:
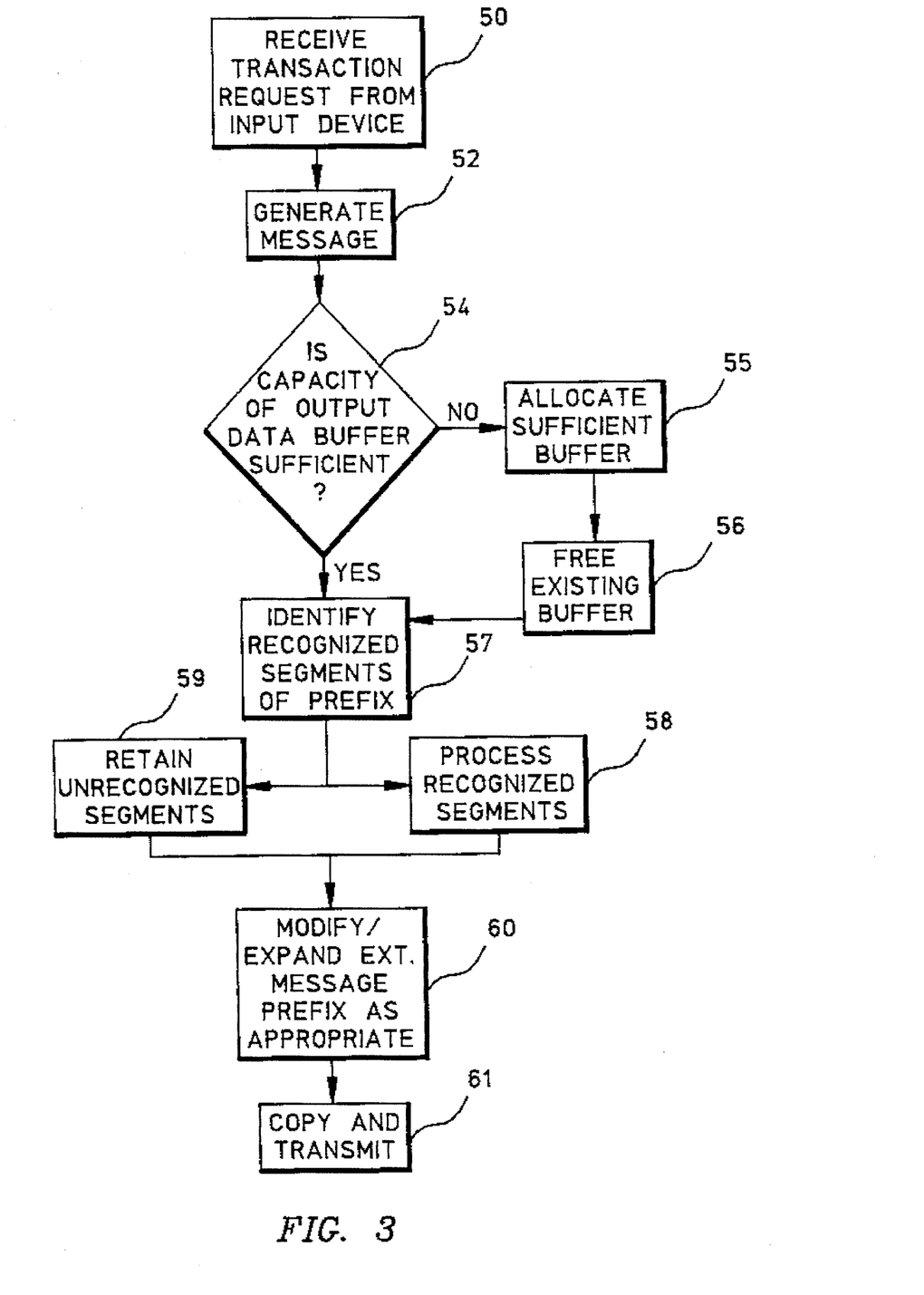
FIG. 3 is a flow chart showing the steps of a transmitting database management system in generating a transaction request message.

Now referring to FIG. 3, the means by which a DBMS, e.g., the first DBMS 12, generates the message 40 can be seen. As shown at block 50 in FIG. 3, the first DBMS 12 receives a transaction request from the first input device 34 (FIG. 1). In other words, the input device 34 generates a transaction request and sends the request to the first DBMS 12. Based upon the request, the DBMS 12 constructs the message 40 by means well-known in the art.

More particularly, the message generator 13 of the first DBMS 12 reformats the transaction request received from the input device 34 into the message 40 format that is required by the particular message generation software of the first DBMS 12. As is well-known in the art, such reformatting includes inserting various data entries of the transaction request into one or more of the fields 48 of the message 40, as well as inserting message characteristic data as appropriate into the fields 48 of the prefixes 42, 44.

Depending upon which particular software upgrade is included in the first DBMS 12, the message generator 13 of the DBMS 12 can generate the extended prefix 44 of the message 40 and include therein particular data fields 48 that may not have previously been required or indeed possible to include with earlier software versions. Thus, the extended prefix 44 essentially has a size which is dynamically variable. Further, the message generator 13 of the DBMS 12 can generate the extended prefix 44 of the message 40 and modify or add to the content of particular data fields 48 from the content that may not have been provided for in earlier software versions. Such content modification and addition typically, though not always, results in changing the size of the extended prefix 44. Accordingly, the extended prefix 44 essentially has an attribute, e.g., size and/or content, which is dynamically variable.

In generating the message 40, the first DBMS 12 ascertains the type of transaction being requested, and based upon this request, identifies which of the DBMSs 14–20 will execute the request. Alternatively, the first DBMS 12 may determine that it will execute the request locally. Thus, the first DBMS 12 is essentially a local DBMS for executing transaction requests from the first input device 34, while the other DBMSs 14–20 are essentially remote DBMSs for executing transaction requests from the first input device 34.

The first DBMS 12 determines which DBMS 12—20 will execute the transaction request based upon considerations well-known in the art, e.g., workload management considerations and software upgrade status of the various DBMSs 12–20. Thus, in the presently preferred embodiment the burden of identifying which of the DBMSs 14–20 will execute the request is shifted from the LU 6.2 input device 34 to the first DBMS 12.

In the event that the first DBMS 12 determines that the transaction request is to be remotely executed, the first DBMS 12 moves to decision block 54, wherein the first DBMS 12 determines whether the size of its output data buffer 12b is sufficient to hold the combined prefixes 42, 44. If it is not, the first DBMS 12 moves to block 55 to allocate additional data memory as a larger replacement data buffer, and thence to block 56 to free the existing output data buffer 12b, for subsequent transmission of the message 40 over one of the links 22, 32 (FIG. 1).

As more fully disclosed below in reference to FIG. 4, the first DBMS 12 may receive a transaction request from another DBMS 14–20, instead of from the device 34. Under such a circumstance, the first DBMS 12 moves to block 57 and determines which of the segments, i.e., fields, of the DBMS-generated transaction request it recognizes and which fields it doesn't recognize.

The first DBMS 12 then moves to blocks 58 and 59, wherein the first DBMS 12 respectively processes the fields it recognizes and retains the fields it does not recognize. From blocks 58 and 59, the first DBMS 12 proceeds to block 60, wherein in response to the processing conducted at block 58 the first DBMS 12 modifies or even expands the extended prefix of the received transaction request. From block 60, the first DBMS 12 copies the prefixes into its output data buffer 12b and moves to block 61 to transmit the message over one of the links 22, 32 (FIG. 1).

Figure 4:
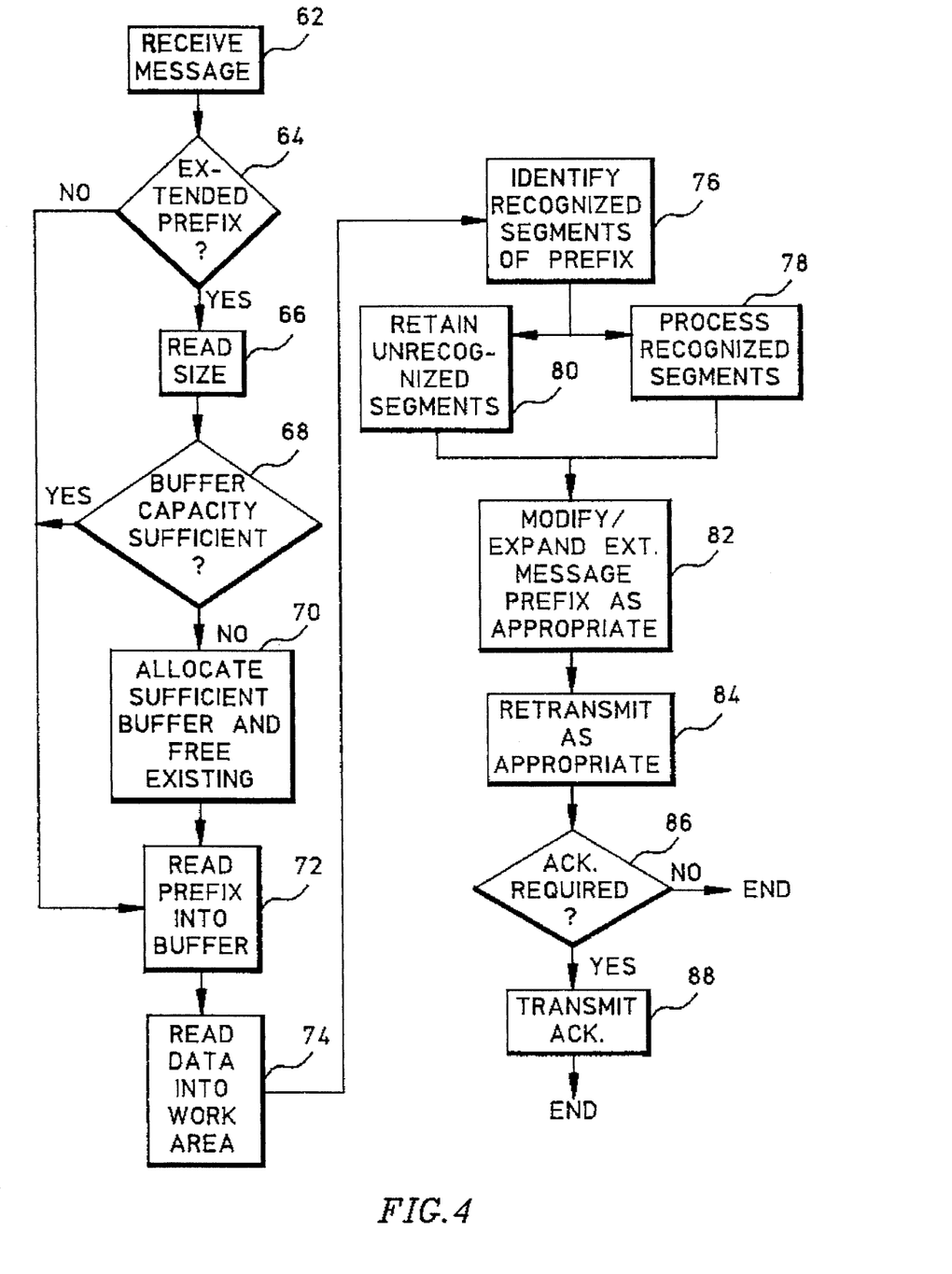
FIG. 4 is a flow chart showing the steps of a receiving database management system in processing a message from a transmitting database management system.

FIG. 4 shows the steps followed by an DBMS 14–20 which receives the transaction request message 40 from the first DBMS 12. For example, when the message 40 has been transmitted over the link 22 to the second DBMS 14, the second DBMS 14 receives the message 40 at block 62 in FIG. 4.

Then, at decision block 64, the second DBMS 14 determines whether the extended prefix 44 is present in the message 40 by reading the extended prefix flag set in the data field 48a (FIG. 2) of the message 40. If it is, the DBMS 14 moves to block 66 to read the size of the prefix of the message 40 from the data field 48b (FIG. 2) of the message 40.

From block 66, the second DBMS 14 moves to decision block 68, wherein the DBMS 14 compares the size of the prefix of the message 40 as indicated by the data field 48b with the size of the input data buffer 14a of the second DBMS 14. Based upon this comparison, the second DBMS 14 determines whether the capacity of its input data buffer 14a is sufficient to hold the prefixes 42, 44 of the message 40. If the capacity of the input data buffer 14a is insufficient to hold the prefixes 42, 44 of the message 40, the second DBMS 14 moves to block 70, wherein the second DBMS 14 allocates additional data memory as a larger replacement data buffer and frees the buffer 14a. The size of the reallocated memory is at least as large as the size of the combined prefixes 42, 44 of the message 40.

Thus, the blocks 64–70 essentially establish a buffer controller for establishing the capacity of the input data buffer 14a in response to the message 40. From blocks 70, 64 (if no extended prefix was present), and 68 (if the capacity of the input data buffer 14a had been sufficient to hold the prefix of the message 40), the second DBMS 14 moves to block 72, wherein the prefixes 42, 44 of the message 40 are read into, i.e., are copied into the input data buffer 14a.

Accordingly, as the skilled artisan will appreciate, the data buffers of the DBMSs 12–20 can be dynamically established such that the data buffers can be increased in size as necessary to accommodate extended message prefixes. Thus, for example, if the second DBMS 14 has an earlier software upgrade than the first DBMS 12 (and, hence, a relatively small input buffer 14a), the second DBMS 14 can nonetheless receive all of the message 40 by dynamically establishing the size of its input data buffer 14a as described above. Without the present invention, the second DBMS 14 would otherwise simply ignore and thus lose additional fields in the extended prefix 44 which had not been provided for in the software of the second DBMS 14.

From block 72, the second DBMS 14 :moves to block 74 and copies the body 46 of the message 40 into the work area of the second DBMS 14. Then, the second DBMS 14 moves to block 76 and determines which of the segments, i.e., fields 48, of the message 40 it recognizes and which fields 48 it doesn't recognize. As the skilled artisan will appreciate, the second DBMS 14 may not recognize certain of the fields 48 generated by the first DBMS 12 in the event that the first DBMS 12, which generated the message 40, has a software system installed which is newer than the software system installed in the second DBMS 14. In ascertaining which fields 48 it recognizes, the second DBMS 14 reads the extended prefix function flag set in the header 48e of the extended prefix 44, which represents the identifications of particular fields 48 that are contained in the extended prefix 44.

The second DBMS 14 then moves to blocks 78 and 80, wherein the second DBMS 14 respectively processes the fields 48 it recognizes and retains the fields 48 it does not recognize. Accordingly, as provided for in the present invention, the second DBMS 14 can receive a message which, because the message is generated by another DBMS having a new software system, may contain fields not recognized by the second DBMS 14, and the second DBMS 14 will nevertheless use the data in fields it does recognize and retain the data of the unrecognized fields without discarding the data. Consequently, the second DBMS 14 can receive messages for use and/or retransmission without corrupting the messages, even when the messages contain unrecognized data fields.

From blocks 78 and 80, the second DBMS 14 proceeds to block 82, wherein in response to the processing conducted at block 78 the second DBMS 14 modifies or even expands the extended prefix 44 in accordance with the programming of the second DBMS 14. More specifically, the second DBMS 14 can modify one or more of the fields 48 of the message 40 or add new fields (not shown) that contain data representative of the results of the processing conducted at block 78. Blocks 76–82 establish an extended prefix handler.

From block 82, the second DBMS 14 moves to block 84 to retransmit the message 40 as appropriate to other DBMSs 12, 16–20. More particularly, one of the other DBMSs 12, 16–20 may be required to further process the message 40. Alternatively, the second DBMS 14 may function as a simple relay for the message 40 and not modify the message 40, but merely retransmit the message 40 to another DBMS 12, 16–20.

The second DBMS 14 next moves to decision block 86, wherein the second DBMS 14 determines whether to transmit a message back to the first DBMS 12 acknowledging that the second DBMS 14 processed the message 40. Typically, such an acknowledgement will be required for transaction requests and program-to-program switches and not be required for message switches. If an acknowledgement is required, the second DBMS 14 moves to block 88 to transmit the acknowledgement message.

While the particular system and method for generating messages for use in transaction networks as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A transaction processing system, comprising:

means for generating a transaction request;

request receiving means coupled to the means for generating for receiving the request;

message generation means coupled to the request receiving means for generating a message having a size and being representative of the transaction, said message generation means having an operational version, wherein the message includes a message body and a prefix containing a size field having contents indicative of the message's size, said prefix including:

a fixed segment providing data of a first set of categories concerning the message body, said first set including a predetermined number of categories independent of the operational version;

an extended segment providing data in a second set of categories concerning the message body, said second set including a variable number of categories selected in response to the operational version; and first message receiving means coupled to the message generation means, the first message receiving means including an input data buffer for receiving the message, wherein the first message receiving means is for adjusting the capacity of the input data buffer in response to the contents of the message's size field to accommodate all of the message in the buffer.

2. The system of claim 1, further comprising a plurality of second message receiving means having a selected interconnection among themselves and the first message receiving means, each said message receiving means including:

a processing message receiving means for recognizing and then processing received transaction requests; and a relay message receiving means for receiving and then relaying messages to other relay message receiving means.

3. The system of claim 2, wherein each message receiving means determines whether to process or relay the message in response a particular category of data contained in the message's prefix.

4. The system of claim 3, wherein, if the prefix includes a first segment received and recognized by a particular one of the message receiving means and a second segment received but unrecognized by the particular message receiving means, the particular message receiving means processes the first segment and retains the second segment.

5. The system of claim 4, wherein each message receiving means includes means for determining the size of the prefix and adjusting the capacity of the input data buffer to be at least equal to the size of the prefix.

6. A method for transmitting transaction requests between a local transaction management system having a first operational version and a plurality of remote transaction management systems having second operational versions at least one of which contrasts with the first operational version, wherein the local transaction management system includes an output data buffer defining a capacity and the remote transaction management systems include an input data buffer defining a capacity, said method comprising the steps of:

(a) entering a transaction request into the local transaction management system;

(b) identifying a particular one of the remote transaction management systems specified by the transaction request to process the transaction request;

(c) operating the local transaction management system in accordance with the first operational version to generate a message representative of the transaction request, the message having an extended prefix representative of at least one predetermined data field, wherein content of the extended prefix is selected in accordance with the first operational version, the message having a size represented by contents of a size field contained in the message;

(d) transmitting the generated the identified remote transaction management system; and (e) receiving the generated message at identified remote transaction management system and adjusting the capacity of the input data buffer to at least equal the size of the message's size in response to the contents of the size field.

7. A data transfer network, comprising:

an input device to generate a transaction request;

a first transaction management system, including:

a message generator coupled to the input device and having a first operational version to receive the transaction request and to generate in response a message having a size and a prefix whose content is specified by the first operational version, said prefix containing a size field whose contents indicate the message's size; and buffers to receive the message from the message generator and transmit the message to a different transaction management system;

a second transaction management system in communication with the first transaction management system to receive the message, the second transaction management system including an input data buffer defining a capacity; and a buffer controller associated with the second transaction management system for adjusting the capacity of the input data buffer in response to the size field to accommodate the message within the input data buffer.

8. The network of claim 7, wherein the second transaction management system includes a transaction executor to execute the transaction request.

9. The network of claim 7, further comprising a plurality of tertiary transaction management systems, a selected interconnection among the tertiary transaction management systems and the first and second transaction management systems, each said transaction management system including a processing message receiver to recognize and then process received transaction requests, and a relay message receiver to receive, recognize, and then relay messages to another transaction management system.

10. The network of claim 9, wherein each message receiver determines whether to process or relay the message in response to a particular category of data contained in the prefix.

11. The network of claim 10, wherein, if the prefix includes a first segment received and recognized by a particular transaction management system and a second segment received but unrecognized by the particular transaction management system, the particular transaction management system processes the first segment and retains the second segment.

12. The network of claim 11, wherein the buffer controller establishes the capacity of the buffer such that all of the message is read into the buffer.

13. A method for transmitting messages between a first transaction management system running a first DBMS version and having an output data buffer and a second transaction management system running a second DBMS version and having an input data buffer, comprising the steps of:

(a) operating the first transaction management system in accordance with the first DBMS version to generate a message having a size and an extended prefix representative of at least one predetermined data field, said message including a size field whose contents are indicative of the message's size;

(b) selecting at least one attribute of the extended prefix in accordance with the first DBMS version, said attribute being selected from the group comprising: message content and message size;

(c) transmitting the generated message from the first transaction management system to the second transaction management system; and (d) adjusting the capacity of the input data buffer of the second transaction management system to at least equal the capacity of the output data buffer of the first transaction management system in response to the contents of the size field.

14. The method of claim 13, wherein at least one remote transaction management system cooperatively interconnects the first and second transaction management systems, and wherein the transmitting step comprises the steps of relaying the message to the second transaction management system via the at least one remote transaction management systems.

15. The method of claim 14, further comprising the step of generating a transaction complete message at the second transaction management system and transmitting the transaction complete message to the first transaction management system.

16. A data transfer system, comprising:

a first computer having an output data buffer;

a second computer having an input data buffer;

a link line interconnecting the first and second computers;

means associated with the first computer for generating messages each having a size represented by contents of a size field and also having an extended prefix, each extended prefix having a predetermined attribute and including at least one predetermined data field each containing data representing characteristics of the associated message, said predetermined attribute being selected from the group comprising: message content and message length;

means associated with the first computer for transmitting messages from the first computer to the second computer via the link line; and means responsive to the contents of the size field for adjusting the capacity of the input data buffer of the second computer to at least equal the message's size.

17. The system of claim 16, further comprising an input device for generating a transaction request and sending the request to the message generating means, wherein the message generating means generates a message representative of the transaction request.

18. The system of claim 17, wherein the second computer includes a transaction executor for executing the transaction request.

19. The system of claim 18, further comprising a plurality of tertiary computers, a selected interconnection among the first, second, and tertiary computers, each computer including a processing message receiver to recognize and then process received transaction requests, and a relay message receiver to receive, recognize, and then relay messages to other computers.

20. The system of claim 19, wherein each message receiving means determines whether to process or relay the message in response to a particular category of data contained in the prefix.

21. The system of claim 20, wherein, if the prefix includes a first segment received and recognized by a particular message receiving means and a second segment received but unrecognized by the particular message receiving means, the particular message receiving means processes the first segment and retains the second segment.

22. The system of claim 16, wherein the first computer has first data processing characteristics and the second computer has second data processing characteristics, wherein at least a portion of the second data processing characteristics differ from the first data processing characteristics.

23. A transaction processing system, comprising:

a source to generate a transaction request;

a local DBMS unit operating pursuant to a particular version of DBMS software, said local DBMS unit including:

a local input data buffer coupled to the transaction request source to receive transaction requests therefrom;

a message generator coupled to the local input data buffer to generate messages representative of the received transaction requests, each said message having a size and including a message body and a prefix containing a size field whose contents indicate the message's size, said prefix including:

a fixed segment providing, for each generated message, data fields having contents that describe a first set of characteristics of the message body, said first set including a predetermined selection of categories of message characteristics independent of the version of DBMS software; and an extended segment providing, for each generated message, data fields having contents that describe a second set of characteristics of the message body, said second set including a selection of categories of message characteristics established in response to the particular version of DBMS software; and a local output data buffer to receive messages from the message generator; and multiple remote DBMS units, each remote DBMS unit operating pursuant to a particular version of DBMS software, each said remote DBMS unit including:

a remote input buffer and a remote output buffer, each remote input buffer being coupled to output buffers of selected other DBMS units to receive messages therefrom, each remote output buffer being coupled to input buffers of selected other DBMS units, wherein at least one remote input buffer is coupled to the local output buffer;

a buffer controller coupled to the remote input buffer to establish the remote input buffer's storage capacity for each message received at the remote input buffer in response to the contents of the received message's size field to accommodate the entire received message in the remote input buffer; and a message receiver coupled to the input buffer, responsive to contents of a particular category of data contained in the prefix of the received message, to process each received message or relay each received message to another DBMS unit.

* * * * *